United States Patent
Sundararajan et al.

(10) Patent No.: US 11,263,269 B2
(45) Date of Patent: Mar. 1, 2022

(54) EXPERT-SYSTEM TRANSLATION OF NATURAL-LANGUAGE INPUT INTO ATOMIC REQUIREMENTS

(71) Applicant: INTERNATIONAL BUSINESS MACHINES CORPORATION, Armonk, NY (US)

(72) Inventors: Mukundan Sundararajan, Bangalore (IN); Priti Srikrishnan, Bangalore (IN); Kiran Nayak, Bengaluru (IN)

(73) Assignee: International Business Machines Corporation, Armonk, NY (US)

( * ) Notice: Subject to any disclaimer, the term of this patent is extended or adjusted under 35 U.S.C. 154(b) by 282 days.

(21) Appl. No.: 16/735,164

(22) Filed: Jan. 6, 2020

(65) Prior Publication Data
US 2021/0209169 A1    Jul. 8, 2021

(51) Int. Cl.
*G06F 16/9032* (2019.01)
*G06N 5/04* (2006.01)
*G06F 40/30* (2020.01)
*G06F 40/284* (2020.01)

(52) U.S. Cl.
CPC ...... *G06F 16/90332* (2019.01); *G06F 40/284* (2020.01); *G06F 40/30* (2020.01); *G06N 5/04* (2013.01)

(58) Field of Classification Search
None
See application file for complete search history.

(56) References Cited

U.S. PATENT DOCUMENTS

| 10,970,487 | B2 * | 4/2021 | Sapugay | G06N 5/022 |
| 2013/0097583 | A1 * | 4/2013 | Kung | G06F 8/24 |
| | | | | 717/105 |
| 2017/0024431 | A1 * | 1/2017 | Dayan | G06F 16/3344 |

(Continued)

OTHER PUBLICATIONS

Honig, William L. et al.; Lack of Attention to Singular (or Atomic) Requirements Despite Benefits for Quality, Metrics and Management; SIGSOFT Software Engineering Notes 41, 4; Aug. 2016; 6 pages.

(Continued)

*Primary Examiner* — Antim G Shah
(74) *Attorney, Agent, or Firm* — Schmeiser, Olsen & Watts; Christopher M. Pignato (57) ABSTRACT

An expert system designed to automatically generate requirements receives a set of natural-language statements. The system extracts from each statement keywords, rules, conditions, and semantic meanings of the statement's verbs. Verbs are organized into groups of synonyms and each statement's verb groups are each associated with one or more of that statement's keywords. Each statement is categorized as having simple, complex, or compound atomicity, as a function of the numbers of that statement's keywords, rules and verbs, and is assigned a degree of orthogonality as a function of the numbers of that statement's keywords that are associated with each of that statement's groups. Each statement is divided into segments and the procedure is repeated upon each segment until all resulting segments have simple atomicity. The segments are forwarded to downstream computerized modules that use the segments as requirements for a planned project.

20 Claims, 5 Drawing Sheets

(56) References Cited

U.S. PATENT DOCUMENTS

2017/0185381 A1* 6/2017 Chandra ................ G06N 5/00
2019/0272323 A1* 9/2019 Galitsky ................ G06F 40/30

OTHER PUBLICATIONS

Sehlhorst, Scott; Atomic Requirements; Sep. 14, 2010; https://www.101ways.com/2010/09/14/atomic-requirements/; 5 pages.

Bridging the Gap—Make Your Requirements Atomic!; https://www.bridging-the-gap.com/make-your-requirements-atomic/; retrieved from the Internet Jul. 22, 2021; 3 pages.

Mell, Peter et al.; "The NIST Definition of Cloud Computing;" National Institute of Standards and Technology; Special Publication 800-145; Sep. 2011; 7 pages.

Parnas, David Lorge et al.; The Modular Structure of Complex Systems; IEEE Transactions on Software Engineering, vol. SE-11, No. 3; Mar. 1985; pp. 259-266.

Parnas, David Lorge; On the criteria to be used in decomposing systems into modules; Carnegie Mellon University Research Showcase @CMU; Aug. 1971; 31 pages.

* cited by examiner

EXPERT-SYSTEM TRANSLATION OF NATURAL-LANGUAGE INPUT INTO ATOMIC REQUIREMENTS

BACKGROUND

The present invention relates in general to automated software-design and project-management applications and in particular to the automated generation of requirements.

Project-management, software-design, and similar applications may attempt to automatically generate requirements for a computer program, business process, or other project under development. When these requirements are derived from natural-language statements of user goals or business needs, an application must translate each statement into a form that can be understood by downstream design tools or project-management systems.

When generating requirements for a complex system made up of multiple subsystems, or for a complex project composed of multiple, independently deliverable functions, current automated requirements-generation applications cannot detect when a single natural-language statement mixes or conflates requirements for more than one subsystem or function. A seemingly simple statement of what appears to be a single requirement may in fact couple multiple requirements directed to different subsystems, tasks, or functions. If those multiple requirements are not decoupled, implementation and maintenance costs of the projects or systems under development can be greatly increased.

An "atomic" requirement is an indivisible requirement that contains only one distinct, independent requirement for only one independently deliverable subsystem or function. An atomic requirement cannot be decomposed into component requirements and a requirements document that contains only atomic requirements does not create unnecessary coupling between independent components, functions, modules, or subsystems.

Current design tools and project-management systems do not guarantee that a user's natural-language statement will be translated into atomic requirements. In general, a human administrator, manager, or designer must manually review and split automatically generated requirements in order to ensure that each resulting requirement is an atomic requirement that is orthogonal (that is, functionally independent) of other requirements. The resulting decoupled atomic requirements can then be used by downstream systems to more efficiently direct the design, structure, or topology of the systems, functions, or projects under development.

SUMMARY

Embodiments of the present invention comprise systems, methods, and computer program products for expert-system translation of natural-language input into atomic requirements. An requirements-generation expert system of an automated code-generation application receives a set of natural-language statements that each state one or more requirements of a computer system or business project under development. The system tags words or phrases of each statement in order to identify a part of speech of each tagged word or phrase and extracts from each statement keywords, rules, conditions, and semantic meanings of words tagged as being distinct verbs, nouns, or other semantically meaningful parts of speech. Each statement's verbs are organized into groups of synonyms and each statement's verb groups are each associated with one or more of that statement's keywords. Each statement is categorized as having simple, complex, or compound atomicity, as a function of the number of that statement's keywords, the number of rules and number of verbs, and is assigned a degree of orthogonality as a function of the numbers of that statement's keywords that are associated with each of that statement's groups. Each statement is divided into segments and the above procedure is repeated upon each successive generation of segments until all segments have simple atomicity. The resulting atomic segments are forwarded to downstream computerized systems that use the segments as requirements for the computer system or business project to be developed.

DETAILED DESCRIPTION

Embodiments of the present invention include systems, methods, and computer program products that provide technical improvements to an automated requirements-generation module of a software-design system, project-management application, or other computerized mechanism that must derive requirements from natural-language input. These improvements enable such automated requirements-generation modules to translate natural-language statements into decoupled, independently deliverable "atomic" requirements that can be forwarded directly to downstream applications without human intervention. Although the term "atomic" may sometimes be used in certain fields to describe requirements that are at least partially coupled or that are in a dependency relationship, this document will always use the term "atomic" to refer to requirements that are completely decoupled from each other.

These embodiments use technologies of artificial intelligence, such as cognitive computing, expert system, lexical analytics, text analytics, or semantic analytics, to infer semantic meaning from natural-language input. Embodiments then, based on intelligence and expert experience garnered during prior machine-learning or training sessions, identify input statements that can be divided into more than one atomic requirement and split the requirements that would otherwise be generated from those statements accordingly.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
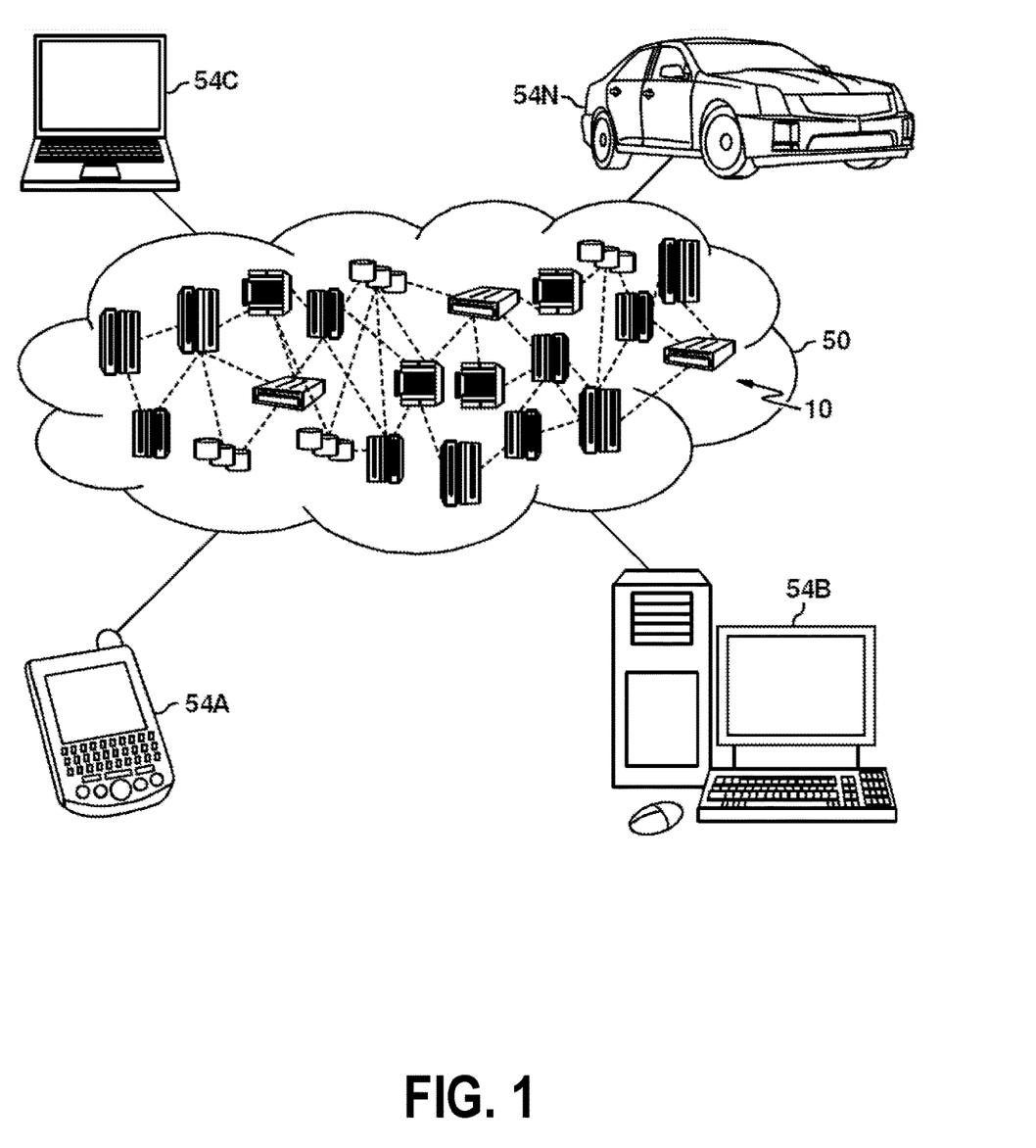
FIG. 1 depicts a cloud computing environment according to an embodiment of the present invention.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
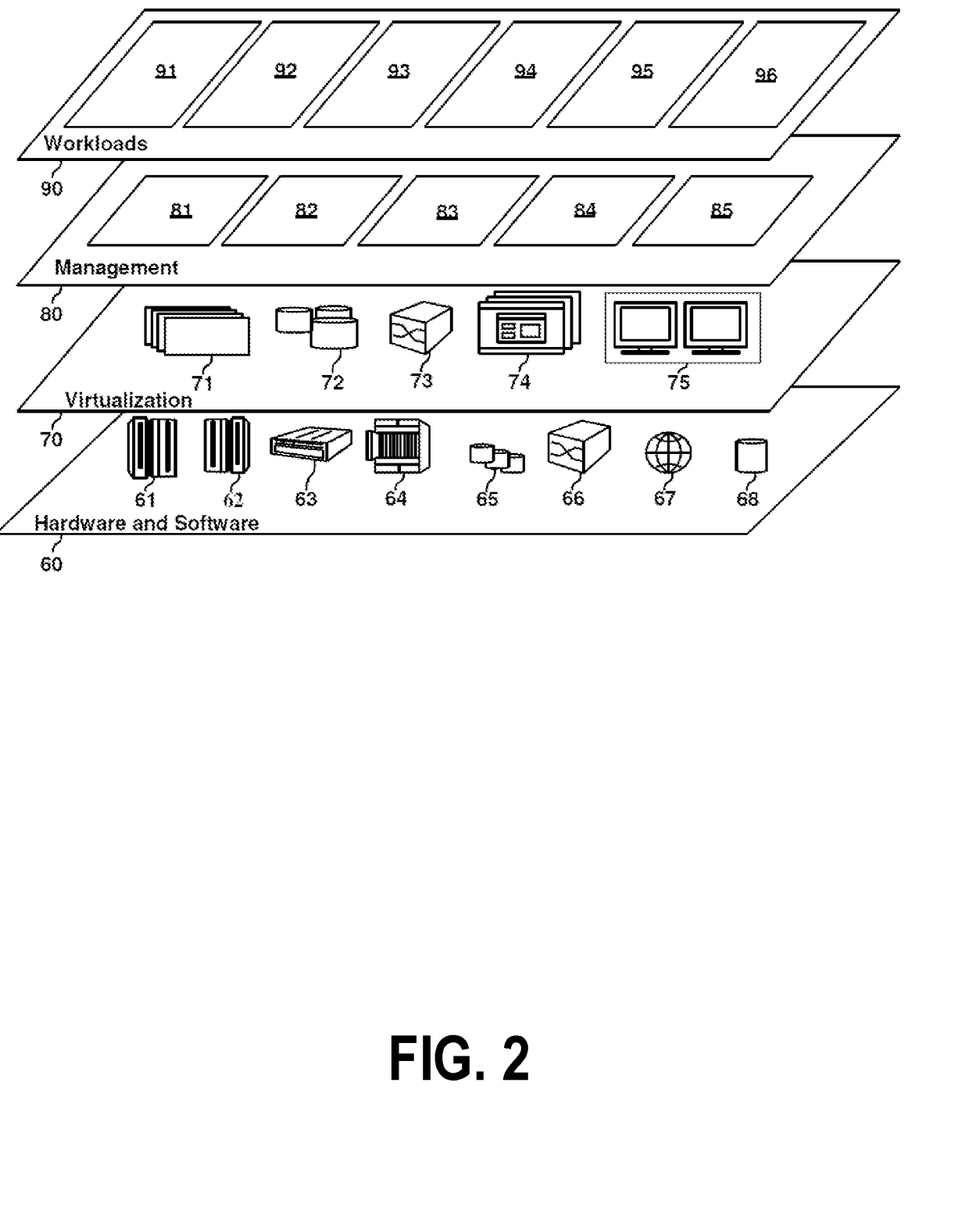
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and orchestration of expert-system translation of natural-language input into atomic requirements.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 3:
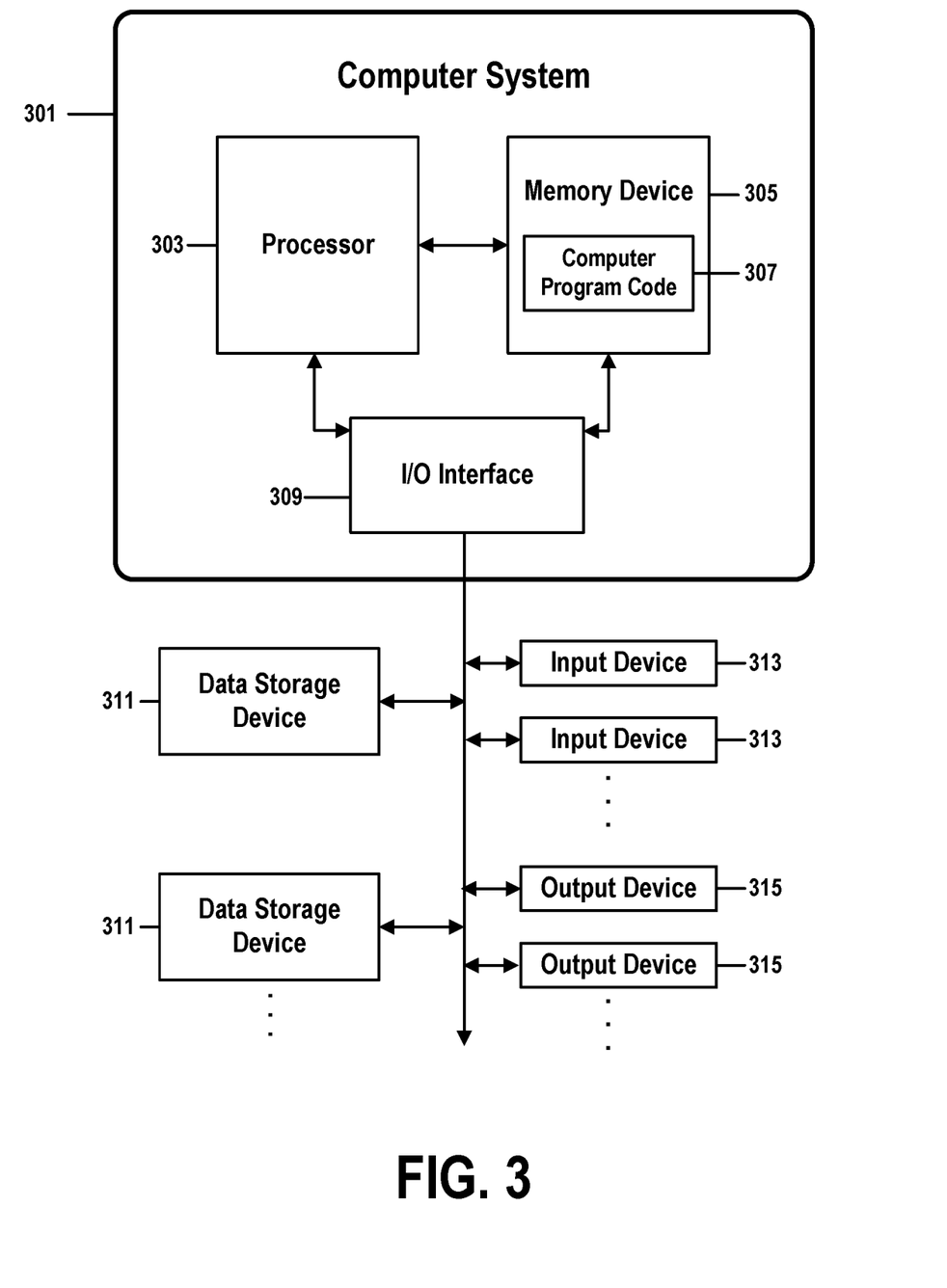
FIG. 3 shows the structure of a computer system and computer program code that may be used to implement a method for expert-system translation of natural-language input into atomic requirements in accordance with embodiments of the present invention.

FIG. 3 shows a structure of a computer system and computer program code that may be used to implement a method for expert-system translation of natural-language input into atomic requirements in accordance with embodiments of the present invention. FIG. 3 refers to objects 301-315.

In FIG. 3, computer system 301 comprises a processor 303 coupled through one or more I/O Interfaces 309 to one or more hardware data storage devices 311 and one or more I/O devices 313 and 315.

Hardware data storage devices 311 may include, but are not limited to, magnetic tape drives, fixed or removable hard disks, optical discs, storage-equipped mobile devices, and solid-state random-access or read-only storage devices. I/O devices may comprise, but are not limited to: input devices 313, such as keyboards, scanners, handheld telecommunications devices, touch-sensitive displays, tablets, biometric readers, joysticks, trackballs, or computer mice; and output devices 315, which may comprise, but are not limited to printers, plotters, tablets, mobile telephones, displays, or sound-producing devices. Data storage devices 311, input devices 313, and output devices 315 may be located either locally or at remote sites from which they are connected to I/O Interface 309 through a network interface.

Processor 303 may also be connected to one or more memory devices 305, which may include, but are not limited to, Dynamic RAM (DRAM), Static RAM (SRAM), Programmable Read-Only Memory (PROM), Field-Programmable Gate Arrays (FPGA), Secure Digital memory cards, SIM cards, or other types of memory devices.

At least one memory device 305 contains stored computer program code 307, which is a computer program that comprises computer-executable instructions. The stored computer program code includes a program that implements a method for expert-system translation of natural-language input into atomic requirements in accordance with embodiments of the present invention, and may implement other embodiments described in this specification, including the methods illustrated in FIGS. 1-5. The data storage devices 311 may store the computer program code 307. Computer program code 307 stored in the storage devices 311 is configured to be executed by processor 303 via the memory devices 305. Processor 303 executes the stored computer program code 307.

In some embodiments, rather than being stored and accessed from a hard drive, optical disc or other writeable, rewriteable, or removable hardware data-storage device 311, stored computer program code 307 may be stored on a static, nonremovable, read-only storage medium such as a Read-Only Memory (ROM) device 305, or may be accessed by processor 303 directly from such a static, nonremovable, read-only medium 305. Similarly, in some embodiments, stored computer program code 307 may be stored as computer-readable firmware, or may be accessed by processor 303 directly from such firmware, rather than from a more dynamic or removable hardware data-storage device 311, such as a hard drive or optical disc.

Thus, the present invention discloses a process for supporting computer infrastructure, integrating, hosting, maintaining, and deploying computer-readable code into the computer system 301, wherein the code in combination with the computer system 301 is capable of performing a method for expert-system translation of natural-language input into atomic requirements.

Any of the components of the present invention could be created, integrated, hosted, maintained, deployed, managed, serviced, supported, etc. by a service provider who offers to facilitate a method for expert-system translation of natural-language input into atomic requirements. Thus, the present invention discloses a process for deploying or integrating computing infrastructure, comprising integrating computer-readable code into the computer system 301, wherein the code in combination with the computer system 301 is capable of performing a method for expert-system translation of natural-language input into atomic requirements.

One or more data storage devices 311 (or one or more additional memory devices not shown in FIG. 3) may be used as a computer-readable hardware storage device having a computer-readable program embodied therein and/or having other data stored therein, wherein the computer-readable program comprises stored computer program code 307. Generally, a computer program product (or, alternatively, an article of manufacture) of computer system 301 may comprise the computer-readable hardware storage device.

In embodiments that comprise components of a networked computing infrastructure, a cloud-computing environment, a client-server architecture, or other types of distributed platforms, functionality of the present invention may be implemented solely on a client or user device, may be implemented solely on a remote server or as a service of a cloud-computing platform, or may be split between local and remote components.

While it is understood that program code 307 for a method for expert-system translation of natural-language input into atomic requirements may be deployed by manually loading the program code 307 directly into client, server, and proxy computers (not shown) by loading the program code 307 into a computer-readable storage medium (e.g., computer data storage device 311), program code 307 may also be automatically or semi-automatically deployed into computer system 301 by sending program code 307 to a central server (e.g., computer system 301) or to a group of central servers. Program code 307 may then be downloaded into client computers (not shown) that will execute program code 307.

Alternatively, program code 307 may be sent directly to the client computer via e-mail. Program code 307 may then either be detached to a directory on the client computer or loaded into a directory on the client computer by an e-mail option that selects a program that detaches program code 307 into the directory.

Another alternative is to send program code 307 directly to a directory on the client computer hard drive. If proxy servers are configured, the process selects the proxy server code, determines on which computers to place the proxy servers' code, transmits the proxy server code, and then installs the proxy server code on the proxy computer. Program code 307 is then transmitted to the proxy server and stored on the proxy server.

In one embodiment, program code 307 for a method for expert-system translation of natural-language input into atomic requirements is integrated into a client, server and network environment by providing for program code 307 to coexist with software applications (not shown), operating systems (not shown) and network operating systems software (not shown) and then installing program code 307 on the clients and servers in the environment where program code 307 will function.

The first step of the aforementioned integration of code included in program code 307 is to identify any software on the clients and servers, including the network operating system (not shown), where program code 307 will be deployed that are required by program code 307 or that work in conjunction with program code 307. This identified software includes the network operating system, where the network operating system comprises software that enhances a basic operating system by adding networking features. Next, the software applications and version numbers are identified and compared to a list of software applications and correct version numbers that have been tested to work with program code 307. A software application that is missing or that does not match a correct version number is upgraded to the correct version.

A program instruction that passes parameters from program code 307 to a software application is checked to ensure that the instruction's parameter list matches a parameter list required by the program code 307. Conversely, a parameter passed by the software application to program code 307 is checked to ensure that the parameter matches a parameter required by the program code 307. The client and server operating systems, including the network operating systems, are identified and compared to a list of operating systems, version numbers, and network software programs that have been tested to work with program code 307. An operating system, version number, or network software program that does not match an entry of the list of tested operating systems and version numbers is upgraded to the listed level on the client computers and upgraded to the listed level on the server computers.

After ensuring that the software, where program code 307 is to be deployed, is at a correct version level that has been tested to work with program code 307, the integration is completed by installing program code 307 on the clients and servers.

Embodiments of the present invention may be implemented as a method performed by a processor of a computer system, as a computer program product, as a computer system, or as a processor-performed process or service for supporting computer infrastructure.

Figure 4:
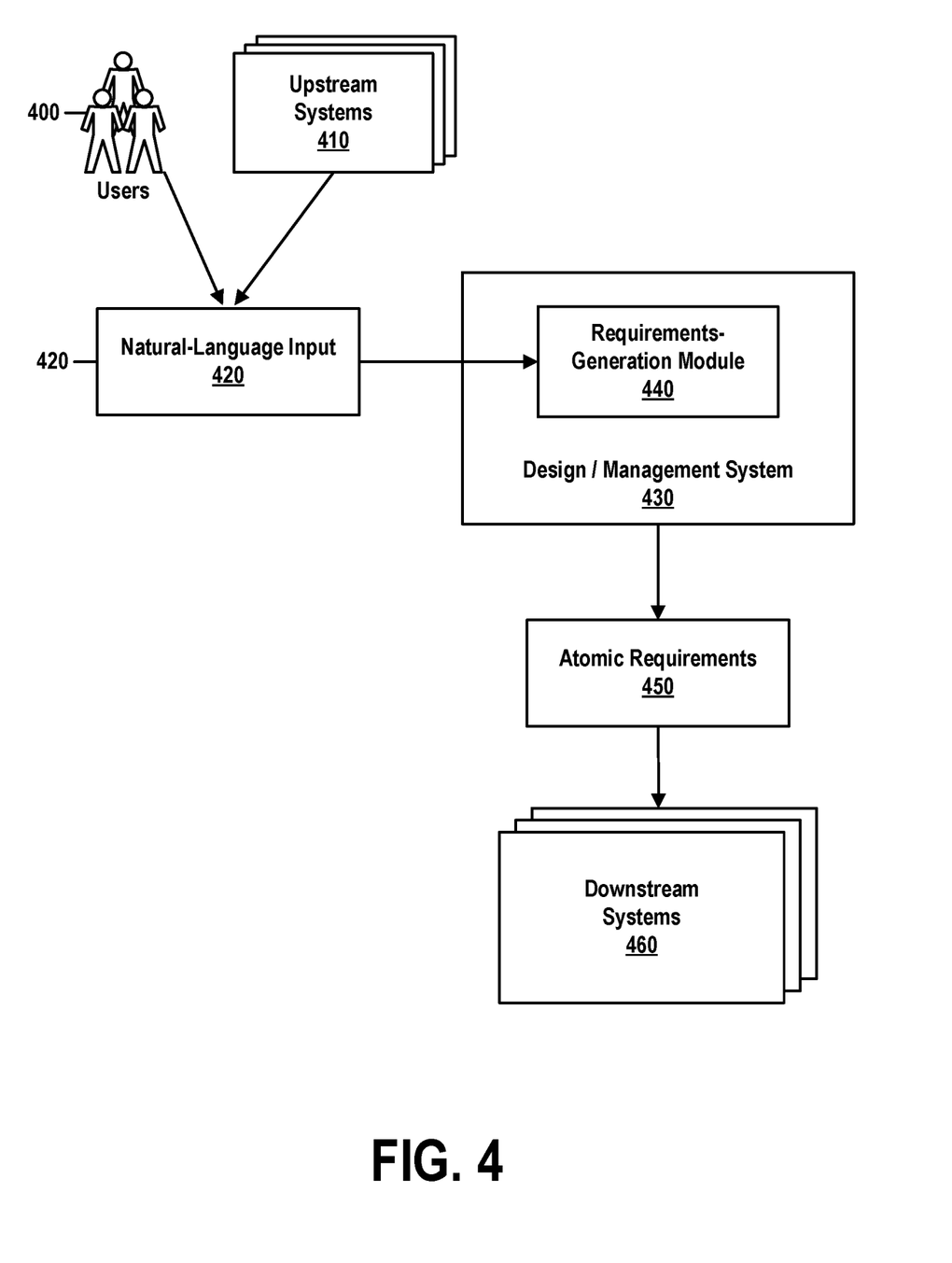
FIG. 4 shows an exemplary structure of a system capable of performing expert-system translation of natural-language input into atomic requirements in accordance with embodiments of the present invention.

FIG. 4 shows an exemplary structure of a system capable of performing expert-system translation of natural-language input into atomic requirements in accordance with embodiments of the present invention. FIG. 4 shows items 400-460.

Application 430 is a computerized system that contains a requirements-generation module 440. Application 430 may be any system that tailors output to satisfy certain user requirements, such as a graphical user interface (GUI)-based automated software-design environment, a code generator, or a project-management system. In embodiments of FIG. 4, these requirements are derived from natural-language input statements 420 submitted by human users 400 or by upstream computerized systems 410.

For example, a specialized computer-aided design (CAD) system 430 that is programmed to design automobile bodies may receive input 420 in the form of natural-language statements submitted directly by human users 400 or received from an upstream e-commence presales application 410 that solicits comments from online users. CAD system 430 might also receive natural-language input 420 in the form of statements extracted from online reviews of existing automobiles by a computerized Internet bot, spider, web crawler, or agent 410.

Figure 5:
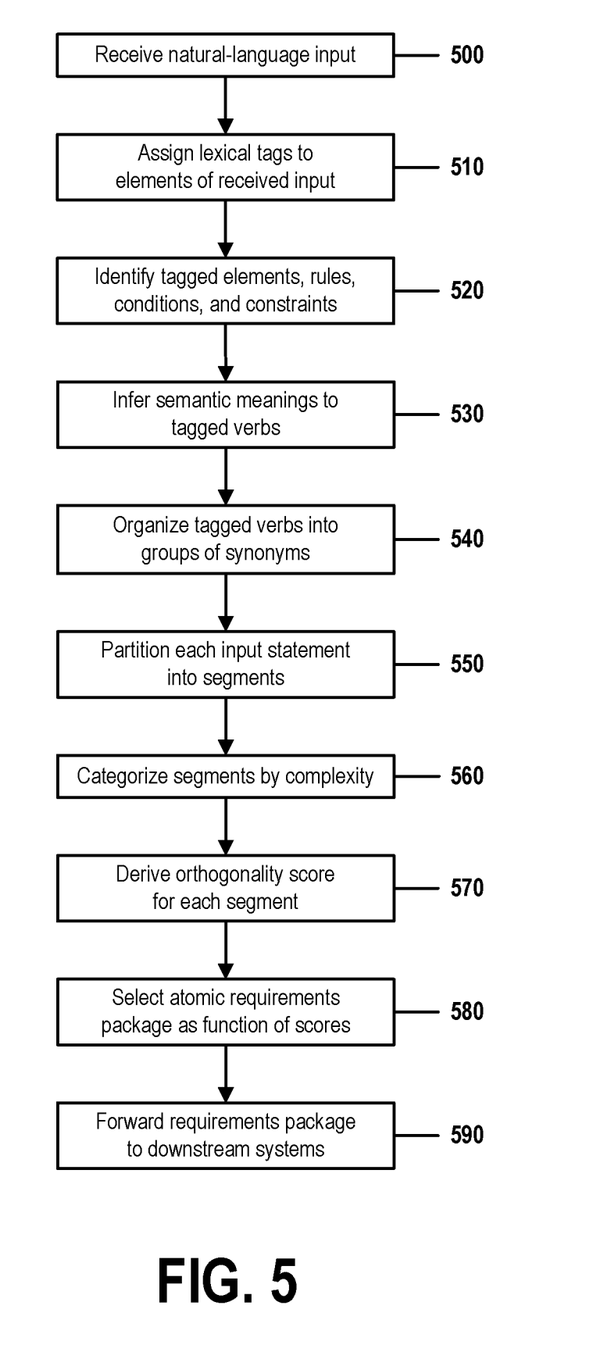
FIG. 5 is a flow chart that illustrates steps of a method for expert-system translation of natural-language input into atomic requirements in accordance with embodiments of the present invention.

Requirements-generation module 440 receives the natural-language input 420 and translates that input 420 into a set of atomic requirements 450 by means of the method of FIG. 5. Application 430 may then use those requirements 450 to perform operations like scheduling project tasks, identifying dependencies, generating flow charts, specifications, or workflow diagrams, managing resources, or producing code templates or computer instructions. In some embodiments, application 430 or requirements-generation module 440 may forward the atomic requirements 450 to downstream systems 460. These downstream systems 460 may then use the atomic requirements 450 to perform any of the above operations, such as scheduling project tasks, generating flow charts, specifications, or workflow diagrams, managing resources, or producing code templates or computer instructions, or may use the atomic requirements 450 to direct the operation of other downstream functions and applications.

FIG. 5 is a flow chart that illustrates steps of a method for expert-system translation of natural-language input into atomic requirements in accordance with embodiments of the present invention. FIG. 5 shows steps 500-590.

In step 500, requirements-generation module 440 receives a set of natural language statements 420 that each purport to represent a requirement of a project or project task, computer program, product, system, or other entity under development.

In step 510, requirements-generation module 440 performs known cognitive language analytics operations to assign lexical tags with words, phrases, and elements of a natural-language statement of the natural-language input 420. Each of these tags may, for example, be a Part of Speech (POS) tag that identifies an element of the natural-language statement 420 as being a particular grammatical part of speech; or a Named Entity Recognition (NER) tag that classifies an element as a named entity that falls into a predefined name category. Such name categories may, for example, include the names of persons, organizations, locations, times or dates, units of measurement, or monetary values.

In step 520, requirements-generation module 440, by means of known methods of artificial intelligence, analyzes the elements of tagged text to identify each tagged element as a keyword, a modifier of another element, a verb or action word associated with a phrase, or other attribute or characteristic. Module 440 in this step also uses known methods of artificial intelligence to identify conditions, rules, and constraints associated with each tagged element. As will be explained below, these conditions, rules, and constraints identify logical elements that may be included in some form by module 440 in the atomic requirements 450.

In step 530, requirements-generation module 440, by means of known methods of artificial intelligence, infers semantic meanings to the keywords, action words, conditions, rules, constraints, and other elements identified in step 520.

In step 540, requirements-generation module 440 organizes the elements analyzed in step 530 into labeled groups. Each group contains elements that share a common semantic meaning, theme, or user intent and that have been assigned a similar POS tag. In some embodiments, each group contains elements tagged as verbs or action words, where each group contains verbs associated with synonymous semantic meanings. In other embodiments, requirements-generation module 440 further organizes the groups into clusters that each contains groups of words or other entities that are associated with the same actions and meanings.

In step 550, requirements-generation module 440 partitions each received natural-language statement 420 into segments, where each segment is associated with a category identified by a group or cluster. For example, if module 440 in step 540 identifies two verb-action groups: {find, locate, search} and {purchase, buy, acquire} an input statement 420 "As an online shopper, I need to find products, a few times a year, so that I can purchase desired products" might in step 560 be partitioned into two segments: a first segment that identifies a requirement for finding desired products a few times a year, and a second segment that identifies a requirement to allow a user to purchase the desired products.

In step 560, requirements-generation module 440 categories each segment generated in step 560 as having simple, complex, or compound atomicity. This categorization is based on each segment's level of abstraction and on the number of subsystems, tasks, or other independently deliverable functions associated with the segment.

As used in this document, the term "atomicity" identifies a requirements statement's level of independence in achieving a defined functionality for a component in a system. That is, a "simple" statement that defines only one independently deliverable requirement is defined as having a greatest level of atomicity. Statements that define more than one independently deliverable requirement are classified as "complex" or "compound," in decreasing order of atomicity.

For example, the natural-language input statement 420 "As an online shopper, I need to find products, a few times a year, so that I can purchase desired products" would have a lower atomicity score than would either of the statements: "As an online shopper, I need to find products a few times a year" and "As an online shopper, I need to purchase desired products." While the former statement conflates two distinct, independent functionality requirements ("finding products" and "purchasing products," as specified by the groups generated in step 540), the latter two statements each identify a requirement for only one distinct, independently deliverable function.

Although any methodology desired by an implementer may be used to assign a particular level of atomicity to a statement or segment, embodiments and examples described in this document incorporate a methodology based on the threshold values shown in Table 1:

TABLE 1

| Atomicity | # of keywords | # of rules | # of groups |
|---|---|---|---|
| Simple | 1-2 | 1 | <=2 |
| Complex | >2 | >1 | <=2 |
| Compound | >2 | >1 | >=2 |

In complex requirement statements verb groups will have common keywords associated with them while in compound requirement statements verb groups may not have common keywords associated.

In step 570, requirements-generation module 440 uses the previous identifications to derive orthogonality scores for each segment. Any method desired by an implementer may be used to perform this step, but certain embodiments perform this step by means of methods similar to those of the below examples, but embodiments and examples described in this document incorporate the following methodology: $f_{12}$ $$L_y = \sqrt{(f_{11}^2 + f_{12}^2 + \ldots)}$$

where $L_y$ is the orthogonality score of a segment or statement y, and where each variable $f_{xy}$ represents the number of keywords associated with the $x^{th}$ verb action group of statement y.

As used in this document, the term "orthogonality" identifies a requirement's degree of separation from other requirements. In general, a requirement's degree of orthogonality is inversely proportional to the requirement's degree of coupling with other requirements. A lower orthogonality score thus indicates that a parent requirement may be further decomposed into component requirements that each have a higher degree of atomicity than did the parent. As shown in the below examples, a requirement's orthogonality score may be derived as a function of the number of grouped words contained in the requirement.

In step 580, requirements-generation module 440 or another component of application 430 selects requirements that have the highest atomicity and orthogonality scores. This selection may be performed by any means known in the art. For example, a requirement may be selected if a sum or product that requirement's two scores exceeds predetermined threshold values. Threshold values may likewise be selected by any method desired by an implementer for a particular implementation, including selection by simple trial-and-error.

In step 590, requirements-generation module 440 or another component of application 430 organizes the selected requirements into a complete requirements package and uses that package to perform desired operations. In some embodiments, application 430 may forward the requirements package or additional documents generated in step 590, to downstream systems 460 that then use the forwarded information to perform further operations.

In one example, a software-design application 430 might in this step use the generated package of atomic requirements to derive a flow chart, signal path, user interface, module structure, platform, or computer instructions of a computer application under development. This derived data could then be automatically forwarded to other applications 460 further downstream, such as a code-generation application or a documentation generator.

In another example, a project-management system 430 might in this step use the requirements package to produce a project schedule, a resource-requirements timeline, or a Gantt chart showing a critical path for a project under development. This generated data might then in turn be forwarded to inventory-management systems, ordering systems, and specialized manufacturing-management applications 460 that automate the performance of methodologies like just-in-time (JIT) inventory management.

In yet another example, a downstream financial-management package 460 may use the forwarded requirements and a resource-requirements document, to develop a projected budget for a project under development. Similarly, a downstream marketing application 460 might use the forwarded requirements to determine where a product to be developed would fit into an existing product line.

The method of FIG. 5 is illustrated by the below examples.

Example 1

Consider a natural-language input 420 that consists of three statements of requirements for a module of an online e-commerce system to be developed. These statements were received from users and a developer of another module of the e-commerce system.

(1) "As an online shopper, I need to find products, a few times a year, so that I can purchase desired products."
(2) "The system must submit all recorded purchases to the fulfillment system for processing in compliance with the fulfillment system's published data-interchange specification."
(3) "As an online shopper, I want to know how the shipping cost is related to the delivery time of each purchase."

In step 510, requirements-generation module 440, using known methods of lexical analysis, assigns tags to elements of the three statements. For example, the module in this step would attempt to assign a POS tag to each word of the first statement, where each POS tag identifies the part of speech of a corresponding word. Among other tags, "shopper," "products," and "year" would be assigned "noun" POS tags and "purchase" and "find" would be assigned "verb" POS tags.

In steps 520-550, requirements-generation module 440, using known methods of artificial intelligence, identifies each tagged element as a keyword, a modifier of another element, a verb or action word associated with a phrase or keyword, or other attribute or characteristic. Module 440 also in these steps organizes action words into action groups associates keywords with each action group, and identifies conditions, rules, and constraints associated with each tagged element.

In this example, module 440 would in these steps identify:
in statement (1):
  keywords: "online shopper," "products," "few times a year"
  constraints: "at least one product," "at least one time"
  business rules: "one or more products to purchase"
  verbs or action words: "find," "purchase"
  verb/action groups: "find" and "purchase"
  keywords associated with each action group:
    keywords "online shopper" and "products" are associated with group "find" ($f_{11}$)
    keyword "few times a year" is associated with action group "purchase" ($f_{12}$)
in statement (2):
  keywords: "system," "purchases," "fulfillment system," "published data-interchange specification"
  constraints: "number of recorded purchases >0"
  business rules: "same day submission into the system" "processing of submitted purchases"
  verbs or action words: "submit for processing," "record"
  verb/action groups: "submit for processing" and "record"
  keywords associated with each action group:
    keywords: "fulfillment system," and "published data-interchange specification" are associated with action group "submit for processing" ($f_{21}$)
    keyword "purchases" is associated with action group "record" ($f_{22}$)
in statement (3):
  keywords: "shopper," "shipping cost," "delivery time," "purchase"
  constraints: "one shipping cost," "one delivery time"
  business rules: "delivery time for every purpose," "shipping cost related to delivery time"
  verbs or action words: "know," "related"
  verb/action groups: "know" and "is related to"
  keywords associated with each action group:
    keywords ""one shipping cost" and "one delivery time" are associated with verb/action group "know" ($f_{31}$)
    keyword "shipping cost," "delivery time," and "purchase" are associated with action group "is related to." ($f_{32}$)

These results produce the counts shown below in Table 2:

TABLE 2

| Statement | # of keywords | # of rules | # of action words |
| --- | --- | --- | --- |
| (1) | 2 | 1 | 2 |
| (2) | 4 | 2 | 2 |
| (3) | 3 | 2 | 2 |

These counts show that an implementer may choose to improve the efficiency of an embodiment by omitting from the keyword count common keywords that the implementer believes would appear in almost every requirement. In above example, keywords "shopper" and "system" are not included in the keyword count for this reason.

The verbs groups are organized by taking into consideration the common meanings of synonyms found in the natural-language statements. Table 3 shows groups that can be organized from the natural-language statements of the current example:

TABLE 3

| Statement | Verbs | Common Meanings | # of groups |
| --- | --- | --- | --- |
| (1) | find | identifying a desired item | 2 |
| (1) | purchase | buying/procuring an item | |
| (2) | submit | provide information | 2 |
| (2) | record | store submitted information | |
| (3) | know | have knowledge of | 2 |
| (3) | related | is in a relationship with | |

But if statement (1) had stated "(1) "As an online shopper, I need to find products a few times a year, so that I can purchase desired products and then locate additional products that I can buy," this statement would contain two additional verbs "locate" and "buy," yielding a total verb count of 4. However, the number of verb groups extracted from statement (1) would remain at 2 because the verb "locate" would be grouped with its synonym "find" and the verb "buy" would be grouped with its synonym "purchase." This would yield two verb groups {find, locate} and {purchase, buy}, as shown in Table 4.

TABLE 4

| Statement | # of keywords | # of rules | # of action words | Atomicity |
|---|---|---|---|---|
| (1) | 2 | 1 | 2 | Simple |
| (2) | 4 | 2 | 2 | Complex |
| (3) | 3 | 2 | 2 | Compound |

In step 570, requirements-generation module 440 assigns an orthogonality score to each statement. Although this calculation may be performed by any methodology desired by an implementer, this example performs this operation by means of the equation listed above in the description of step 570. This yields:

Orthogonality of statement (1):

$$L_1 = \sqrt{(f_{11}^2 + f_{12}^2)} = \sqrt{(2^2 + 1^2)} = \sqrt{5} = 2.236067977$$

Orthogonality of statement (2):

$$L_2 = \sqrt{(f_{21}^2 + f_{22}^2)} = \sqrt{(3^2 + 1^2)} = \sqrt{10} = 3.16$$

Orthogonality of statement (3):

$$L_3 = \sqrt{(f_{31}^2 + f_{32}^2)} = \sqrt{(2^2 + 3^2)} = \sqrt{13} = 3.605551275$$

In step 580, requirements-generation module 440 selects segments or statements that have the highest degree of atomicity and orthogonality. Here, module 440 initially selects statements that have an orthogonality score (a "degree of orthogonality) greater than 3, but the present invention is flexible enough to accommodate any threshold value desired by an implementer or deemed to be necessary in order to accommodate a particular real-world implementation.

The embodiment of the current example uses an orthogonality threshold value of 3 because an implementer decided that it is sufficiently likely that any statement with a degree of orthogonality greater than 3 is a likely candidate for decoupling because such statements comprise strong linkages to more than one subsystem. For example, statement (2), which has a degree of orthogonality greater than 3.6, states: (2) "The system must submit all recorded purchases to the fulfillment system for processing in compliance with the fulfillment system's published data-interchange specification." This statement can be split into two segments, each of which contains only one verb-action group and each of which is a requirement for only one independently deliverable subsystem:

(2a) The system must submit all recorded purchases to the fulfillment system.

(2b) All the submitted records should be processed n compliance with the fulfillment system's published data-interchange specification."

Applying the method of step 580, the atomicity of these two segments is categorized as shown in Table 5:

TABLE 5

| Statement | # of keywords | # of rules | # of action words | Atomicity |
|---|---|---|---|---|
| (2a) | 2 | 1 | 1 | Simple |
| (2b) | 2 | 1 | 1 | Simple |

The same procedure may be applied to statement (3), which reads: (3) "As an online shopper, I want to know how the shipping cost is related to the delivery time of each purchase." As with statement (2), statement (3) may be split into two segments that each contains one action-word group:

(3a) "As an online shopper, I want to know the delivery time of each purchase."

(3b) "As an online shopper, I want to know the shipping cost that is associated with the selected delivery time."

Applying the method of step 580, the atomicity of these two segments is categorized as shown in Table 6:

TABLE 6

| Statement | # of keywords | # of rules | # of action words | Atomicity |
|---|---|---|---|---|
| (3a) | 2 | 1 | 1 | Simple |
| (3b) | 2 | 1 | 1 | Simple |

In some embodiments, this decomposition procedure may be repeated until all statements or segments of statements have been reduced to simple atomicity, or until no further decomposition can be performed.

In step 590, requirements-generation module 440 forwards the final set of atomic statements or segments derived in the previous steps to other module or modules of application 430 or to one or more downstream systems. These other modules and downstream systems then rely upon the atomic requirements to direct further program design, coding, job scheduling, resource management, or other types of tasks that are performed in order to satisfy the forwarded requirements. The atomic nature of the forwarded requirements helps ensure that the operations and functions directed by the forwarded requirements do not suffer from unnecessary coupling or blurring of the boundaries of objects that should operate as distinct, independently deliverable black boxes.

Examples and embodiments of the present invention described in this document have been presented for illustrative purposes. They should not be construed to be exhaustive nor to limit embodiments of the present invention to the examples and embodiments described here. Many other modifications and variations of the present invention that do not depart from the scope and spirit of these examples and embodiments will be apparent to those possessed of ordinary skill in the art. The terminology used in this document was chosen to best explain the principles underlying these examples and embodiments, in order to illustrate practical applications and technical improvements of the present invention over known technologies and products, and to enable readers of ordinary skill in the art to better understand the examples and embodiments disclosed here.

What is claimed is:

1. A requirements-generation expert system of an automated code-generation application comprising a processor, a memory coupled to the processor, and a computer-readable hardware storage device coupled to the processor, the storage device containing program code configured to be run by the processor via the memory to implement a method for expert-system translation of natural-language input into atomic requirements, the method comprising:

the expert system receiving natural-language statements that each represent one or more requirements for a computer program under development;

the expert system assigning lexical tags to at least one element of each received statement, where each lexical tag identifies a part of speech of an element;

the expert system inferring a semantic meaning of each element that is tagged as a verb or that is tagged as a noun;

the expert system extracting, from each statement of the received statements, a set of keywords and a set of rules, where each keyword of the set of keywords is a tagged element that is tagged as a noun;

the expert system organizing the elements tagged as verbs into verb groups, where each verb group contains elements that have synonymous semantic meanings and that are contained in a same statement of the received statements;

the expert system identifying a degree of atomicity of each statement of the received statements as a function of a number of keywords, a number of rules, and a number of verbs contained in the each statement;

the expert system associating each verb group with one or more keywords, where the one or more keywords and the each verb group are contained in a same statement of the received statements;

the expert system deriving a degree of orthogonality of each statement of the received statements as a function of a number of the keywords of the each statement that are associated with each verb group of the each statement;

the expert system segmenting, as a function of the identifying, the associating, and deriving, a parent statement of the received statements into segments, where each segment has a degree of atomicity at least as great as an atomicity of the segment's parent statement and each segment has a degree of orthogonality at least as great as a degree of orthogonality of the segment's parent statement;

the expert system forwarding the segments to a downstream computerized system; and the expert system directing the downstream system to use the segments as requirements for the computer program.

2. The expert system of claim 1,
where an atomicity of a statement is characterized as simple atomicity if that statement contains one or two keywords, one rule, and no more than two verb groups,
where an atomicity of a statement is characterized as complex atomicity if that statement contains more than two keywords, at least one rule, and no more than two verb groups,
where an atomicity of a statement is characterized as compound atomicity if that statement contains more than two keywords, at least one rule, and at least two verb groups,
where complex atomicity is deemed to be a greater degree of atomicity than simple atomicity, and
where compound atomicity is deemed to be a greater degree of atomicity than complex atomicity.

3. The expert system of claim 2, further comprising:
the expert system, prior to the forwarding, repeating the assigning, the inferring, the extracting, the organizing, the identifying, the associating, and the deriving upon successive generations of segments until all segments have simple atomicity.

4. The expert system of claim 1, where a degree of orthogonality of a received statement that contains n verb groups is computed as $\sqrt{(f_1^2+f_2^2+ \ldots +f_n)}$, where each variable $f_x$ represents a number of keywords associated an $x^{th}$ verb group of the n verb groups.

5. The expert system of claim 1, where the inferring and the extracting each comprise at least one technology of machine intelligence by which the expert system has learned how to infer semantic meanings, identify keywords, and extract rules by analyzing accuracies of past performances of similar actions.

6. The expert system of claim 1, where each segment represents a requirement, of the computer program, comprised by that segment's parent statement.

7. The expert system of claim 1, where a first rule of the inferred set of rules identifies a constraint on the computer program imposed by a requirement contained in a received statement from which the first rule has been inferred.

8. The expert system of claim 1, where certain keywords are omitted from a count of the number of keywords considered during the identification of the degree of atomicity.

9. The expert system of claim 1, where an element of a processed statement of the received statements is a set of one or more words comprised by the processed statement.

10. A method for automated translation of natural-language input into atomic requirements, the method comprising:
a requirements-generation expert system, of an automated code-generation application, comprising a processor, a memory coupled to the processor, and a computer-readable hardware storage device coupled to the processor, the storage device containing program code configured to be run by the processor via the memory to implement the method for expert-system translation of natural-language input into atomic requirements, receiving natural-language statements that each represent one or more requirements for a computer program under development;

the expert system assigning lexical tags to at least one element of each received statement, where each lexical tag identifies a part of speech of an element;

the expert system inferring a semantic meaning of each element that is tagged as a verb or that is tagged as a noun;

the expert system extracting, from each statement of the received statements, a set of keywords and a set of rules, where each keyword of the set of keywords is a tagged element that is tagged as a noun;

the expert system organizing the elements tagged as verbs into verb groups, where each verb group contains elements that have synonymous semantic meanings and that are contained in a same statement of the received statements;

the expert system identifying a degree of atomicity of each statement of the received statements as a function of a number of keywords, a number of rules, and a number of verbs contained in the each statement;

the expert system associating each verb group with one or more keywords, where the one or more keywords and the each verb group are contained in a same statement of the received statements;

the expert system deriving a degree of orthogonality of each statement of the received statements as a function of a number of the keywords of the each statement that are associated with each verb group of the each statement;

the expert system segmenting, as a function of the identifying, the associating, and deriving, a parent statement of the received statements into segments, where each segment has a degree of atomicity at least as great as an atomicity of the segment's parent statement and each segment has a degree of orthogonality at least as great as a degree of orthogonality of the segment's parent statement;

the expert system forwarding the segments to a downstream computerized system; and the expert system directing the downstream system to use the segments as requirements for the computer program.

11. The method of claim 10, where an atomicity of a statement is characterized as simple atomicity if that statement contains one or two keywords, one rule, and no more than two verb groups, where an atomicity of a statement is characterized as complex atomicity if that statement contains more than two keywords, at least one rule, and no more than two verb groups, where an atomicity of a statement is characterized as compound atomicity if that statement contains more than two keywords, at least one rule, and at least two verb groups, where complex atomicity is deemed to be a greater degree of atomicity than simple atomicity, and where compound atomicity is deemed to be a greater degree of atomicity than complex atomicity.

12. The method of claim 11, further comprising:

the expert system, prior to the forwarding, repeating the assigning, the inferring, the extracting, the organizing, the identifying, the associating, and the deriving upon successive generations of segments until all segments have simple atomicity.

13. The method of claim 10, where a degree of orthogonality of a received statement that contains n verb groups is computed as $\sqrt{(f_1^2+f_2^2+ \ldots +f_n)}$, where each variable $f_x$ represents a number of keywords associated an $x^{th}$ verb group of the n verb groups.

14. The method of claim 10, where the inferring and the extracting each comprise at least one technology of machine intelligence by which the expert system has learned how to infer semantic meanings, identify keywords, and extract rules by analyzing accuracies of past performances of similar actions.

15. The method of claim 10, further comprising providing at least one support service for at least one of creating, integrating, hosting, maintaining, and deploying computer-readable program code in the computer system, wherein the computer-readable program code in combination with the computer system is configured to implement the receiving, the assigning, the inferring, the extracting, the organizing, the identifying, the associating, the deriving, the segmenting, the forwarding, and the directing.

16. A computer program product, comprising a computer-readable hardware storage device having a computer-readable program code stored therein, the program code configured to be executed by a requirements-generation expert system, of an automated code-generation application, comprising a processor, a memory coupled to the processor, and a computer-readable hardware storage device coupled to the processor, the storage device containing program code configured to be run by the processor via the memory to implement a method for expert-system translation of natural-language input into atomic requirements, the method comprising:

the expert system receiving natural-language statements that each represent one or more requirements for a computer program under development;

the expert system assigning lexical tags to at least one element of each received statement, where each lexical tag identifies a part of speech of an element;

the expert system inferring a semantic meaning of each element that is tagged as a verb or that is tagged as a noun;

the expert system extracting, from each statement of the received statements, a set of keywords and a set of rules, where each keyword of the set of keywords is a tagged element that is tagged as a noun;

the expert system organizing the elements tagged as verbs into verb groups, where each verb group contains elements that have synonymous semantic meanings and that are contained in a same statement of the received statements;

the expert system identifying a degree of atomicity of each statement of the received statements as a function of a number of keywords, a number of rules, and a number of verbs contained in the each statement;

the expert system associating each verb group with one or more keywords, where the one or more keywords and the each verb group are contained in a same statement of the received statements;

the expert system deriving a degree of orthogonality of each statement of the received statements as a function of a number of the keywords of the each statement that are associated with each verb group of the each statement;

the expert system segmenting, as a function of the identifying, the associating, and deriving, a parent statement of the received statements into segments, where each segment has a degree of atomicity at least as great as an atomicity of the segment's parent statement and each segment has a degree of orthogonality at least as great as a degree of orthogonality of the segment's parent statement;

the expert system forwarding the segments to a downstream computerized system; and the expert system directing the downstream system to use the segments as requirements for the computer program.

17. The computer program product of claim 16, where an atomicity of a statement is characterized as simple atomicity if that statement contains one or two keywords, one rule, and no more than two verb groups, where an atomicity of a statement is characterized as complex atomicity if that statement contains more than two keywords, at least one rule, and no more than two verb groups, where an atomicity of a statement is characterized as compound atomicity if that statement contains more than two keywords, at least one rule, and at least two verb groups, where complex atomicity is deemed to be a greater degree of atomicity than simple atomicity, and where compound atomicity is deemed to be a greater degree of atomicity than complex atomicity.

18. The computer program product of claim 17, further comprising:

the expert system, prior to the forwarding, repeating the assigning, the inferring, the extracting, the organizing, the identifying, the associating, and the deriving upon successive generations of segments until all segments have simple atomicity.

19. The computer program product of claim 16, where a degree of orthogonality of a received statement that contains n verb groups is computed as $\sqrt{(f_1^2+f_2^2+ \ldots +f_n)}$, where each variable $f_x$ represents a number of keywords associated an $x^{th}$ verb group of the n verb groups.

20. The computer program product of claim 16, where the inferring and the extracting each comprise at least one technology of machine intelligence by which the expert system has learned how to infer semantic meanings, identify keywords, and extract rules by analyzing accuracies of past performances of similar actions.

\* \* \* \* \*